Jan. 19, 1960 M. A. BUNFORD 2,921,340
CENTRIFUGAL MOLDING MACHINE WITH HYDRAULIC CONTROL MEANS
Filed July 2, 1954 7 Sheets-Sheet 1

INVENTOR
MAX ADOLPHE BUNFORD
By Linton and Linton
ATTORNEYS

Jan. 19, 1960　　　M. A. BUNFORD　　　2,921,340
CENTRIFUGAL MOLDING MACHINE WITH HYDRAULIC CONTROL MEANS
Filed July 2, 1954　　　　　　　　　　7 Sheets-Sheet 3

INVENTOR
MAX ADOLPHE BUNFORD
BY Linton and Linton
ATTORNEYS

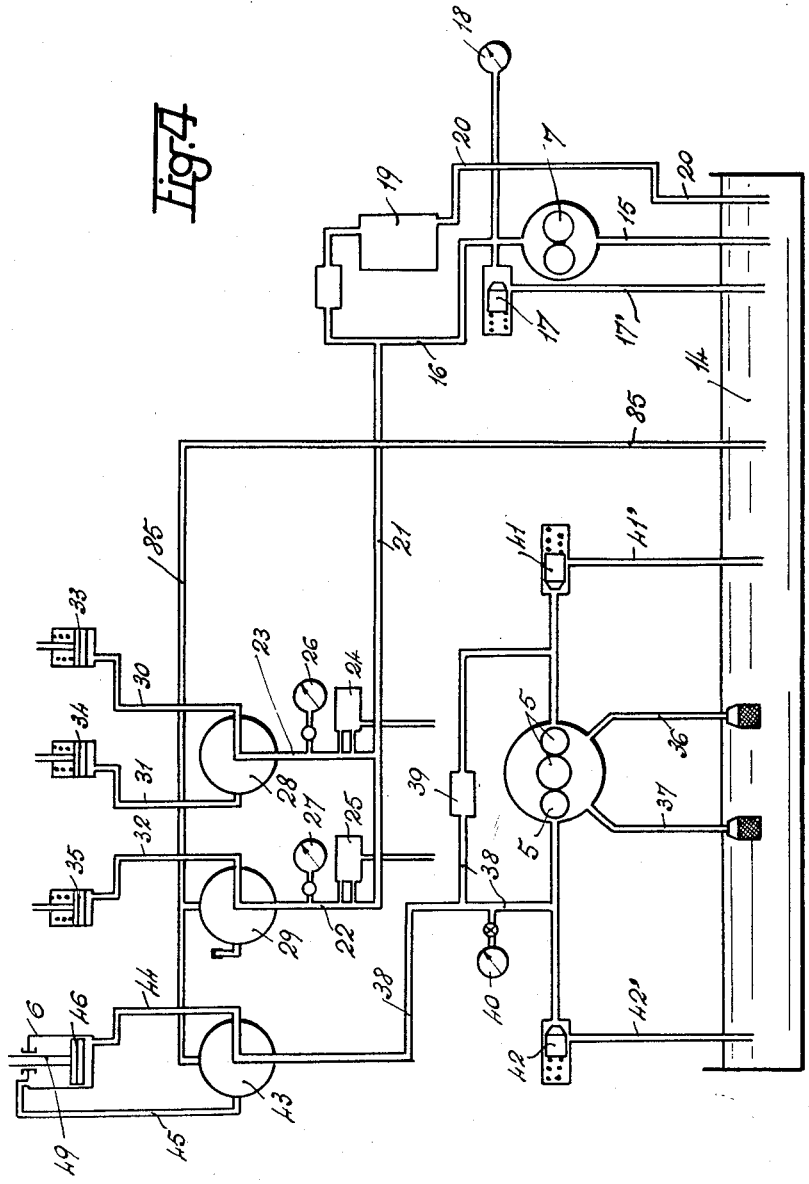

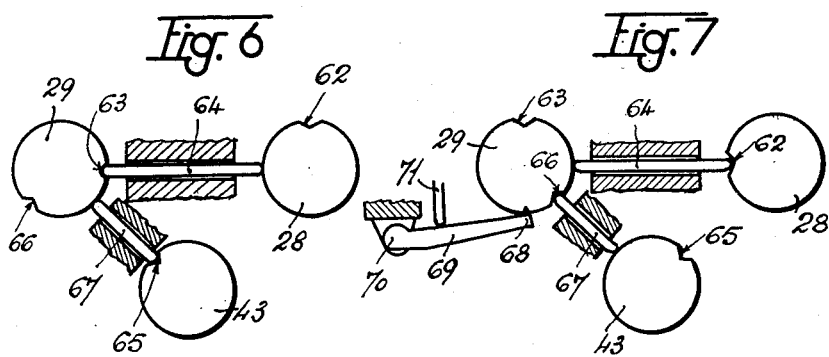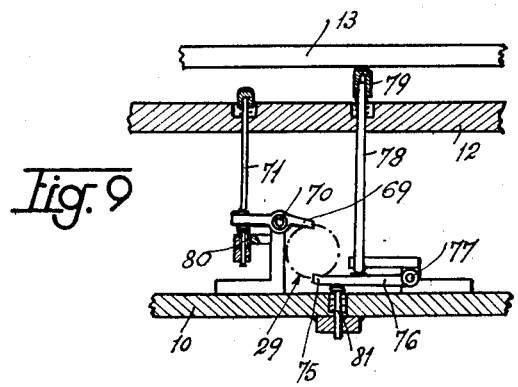

Fig. 10

United States Patent Office 2,921,340
Patented Jan. 19, 1960

2,921,340

CENTRIFUGAL MOLDING MACHINE WITH HYDRAULIC CONTROL MEANS

Max Adolphe Bunford, Monte Carlo, Monaco

Application July 2, 1954, Serial No. 440,988

Claims priority, application France July 8, 1953

4 Claims. (Cl. 18—26)

My invention has for its object a centrifugally operating moulding machine.

Machines of this type are already known which include generally speaking an electric driving motor, a main shaft carrying the mould and driven into rotation by said motor through the agency of a clutch and of braking means, a table for the ejection of the moulded articles, which table is vertically shiftable through any suitable means while the different parts are often carried inside a protecting hood provided in certain cases with a cover extending over the mould and the ejection table.

The novelty of my improved machine consists in that the conrtol means are of a hydraulic type and are interconnected whereby none of the parts of the machine, such as the brake acting on the main shaft, the clutch controlling said main shaft, the part controlling the movements of the ejection table, may be untimely actuated and said parts follow one another in operation in a predetermined order, which provides perfect safety and reliability in the working of the machine.

By reason of the general high speed of execution of the successive centrifugal moulding steps of the cycle of operation, it is very important for each step to be performed reliably after the step which precedes it normally and before that which follows it normally and only then.

The interconnection of the operative steps may be obtained mechanically, but this would lead to a great complexity in structure, whereas it may be obtained very simply with a general hydraulic control, as disclosed hereinafter.

This hydraulic control may be performed by means of a single pump or of two pumps one of which operates only intermittently under the control of the first pump, for instance, and will provide solely for the movements of the ejection table. The first pump provides then for the control of all the other operations and also for the lubrication of the different parts of the machine if lubricating oil is used as a driving fluid.

The interconnection of the braking and clutch control systems and of the movements of the ejection table may be performed by means of many valves, preferably rotary valves, distributing the driving fluid and associated with locking means which hold slide valves or one such slide valve inoperative as long as another slide valve has not been shifted so as to produce the corresponding operative step.

Each valve may, if it is of a rotary type, be provided with one or more notches adapted to be engaged, so as to hold the valve fast, by a bolt or rod inserted between said valve and an adjacent valve. Such a bolt enters through one end of the notch in one of the valves to hold the latter fast while it engages through its other end the periphery of the adjacent valve which is thus free and may be rocked so as to produce the corresponding control step, the reverse being the case after a rotation in the opposite direction of the second valve into a position for which it is in its turn locked by the bolt.

Thus, the interconnection between the different parts should preferably be such that it prevents the operative engagement of the main shaft before its brake is released, or the braking thereof before it is disengaged, while the ejection table cannot be raised before the main shaft has been disconnected and braked.

I may also advantageously provide for the control of the brake-releasing valve (the brake should be released before the clutch controlling the main shaft is engaged), to be allowed only upon a return into its lower position of the ejection table so as to cut out any possibility of the machine operating when the ejection table is raised.

It is again possible to control the valve releasing the brake by the closing of the mould cover so as to prevent any operation of the machine with its cover open.

Lastly, the machine forming the object of my invention may include means for adjusting the vertical position of the ejection table before any moulding operation and thereby the ejection height at which said table operates.

Further features and advantages of my invention will appear from the reading of the following description of an embodiment of my invention, given by way of examples and by no means in a limiting sense, reference being made to accompanying drawings, wherein:

Fig. 4 is a diagram of the hydraulic connections of the machine.

Figs. 6 and 7 are two diagrammatic views of the rotary fluid-controlling valve with the means interconnecting them.

Fig. 9 is a detail view of the means holding the brake-controlling valves under control of the ejection table and of the mould cover.

Figure 10:
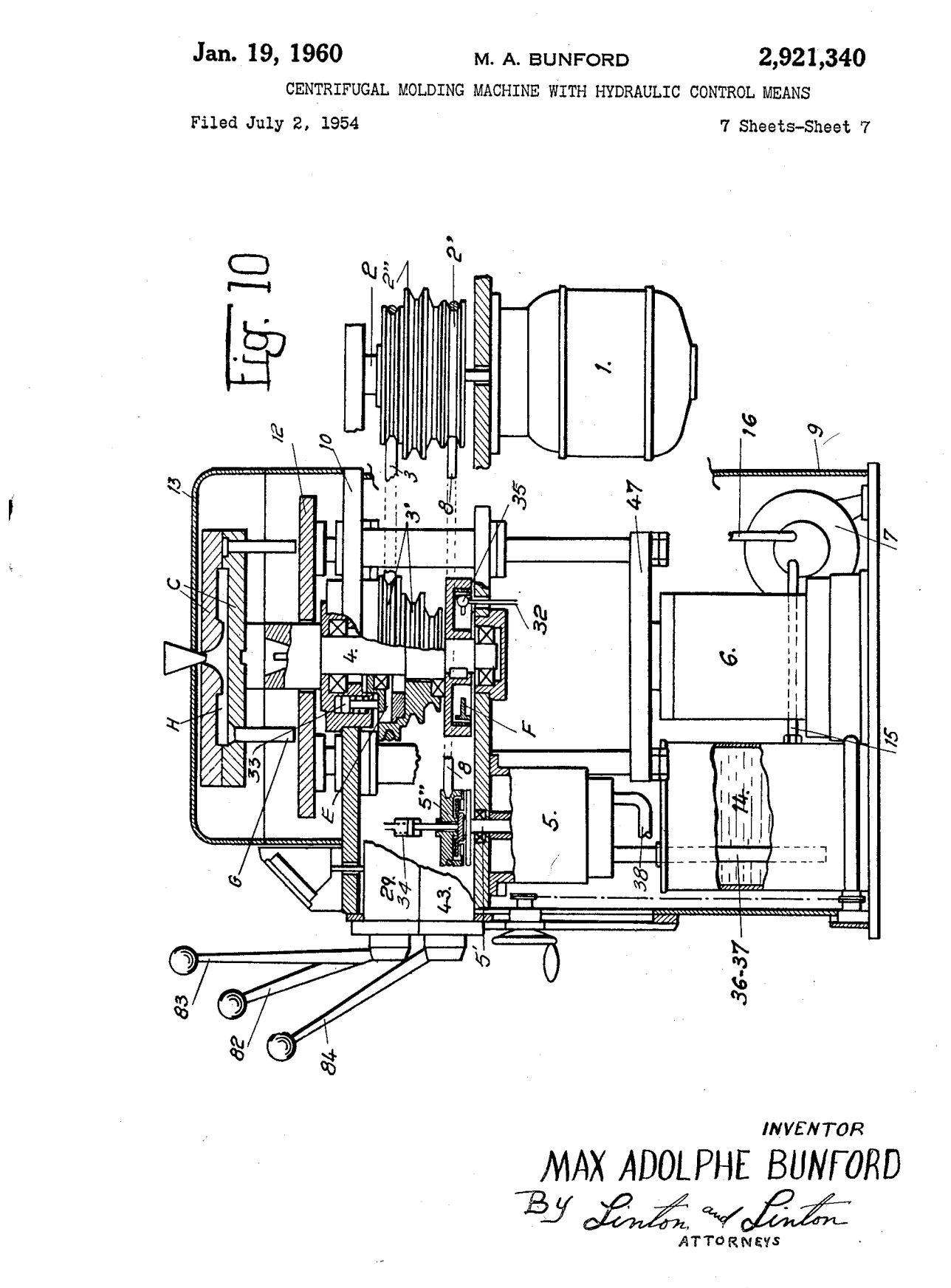

Fig. 10 is a cross-sectional view with parts broken away to show interior details of a complete centrifugal moulding machine according to the invention and taken on an elevation similar to Fig. 1 but with the drive motor sown to one side.

Figure 1:
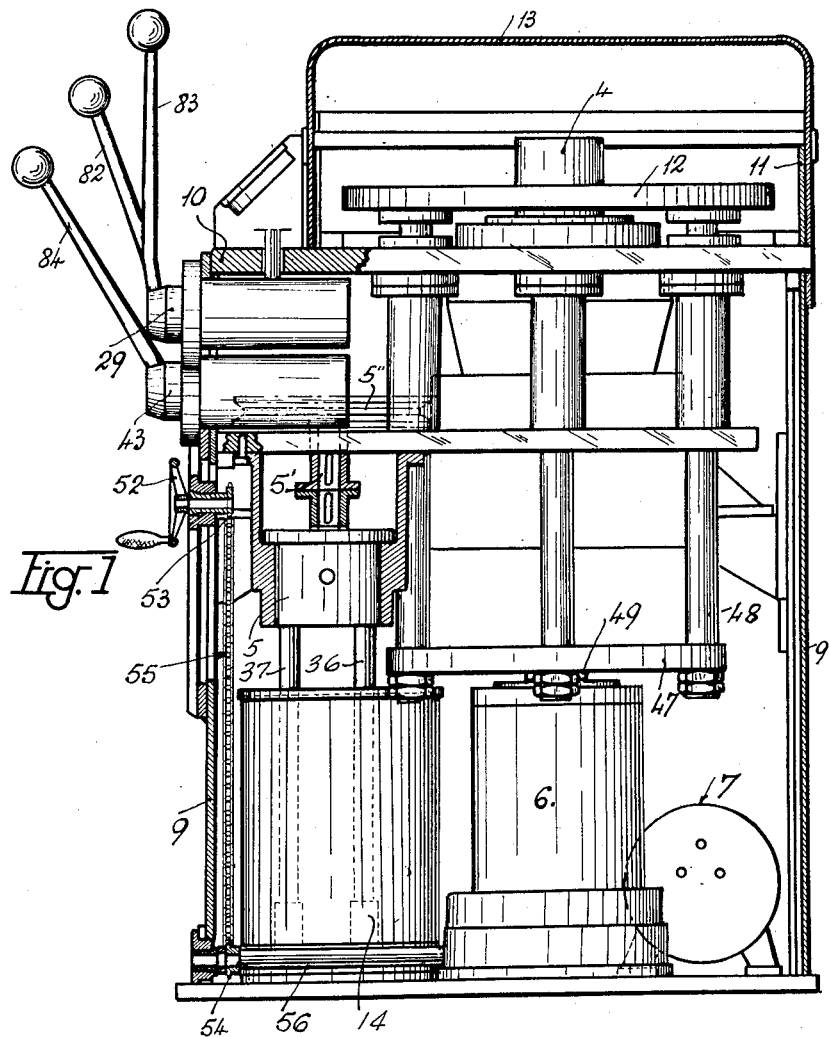
Fig. 1 is a diagrammatic elevational side view of the machine after removal of the side wall of the casing.
Figure 2:
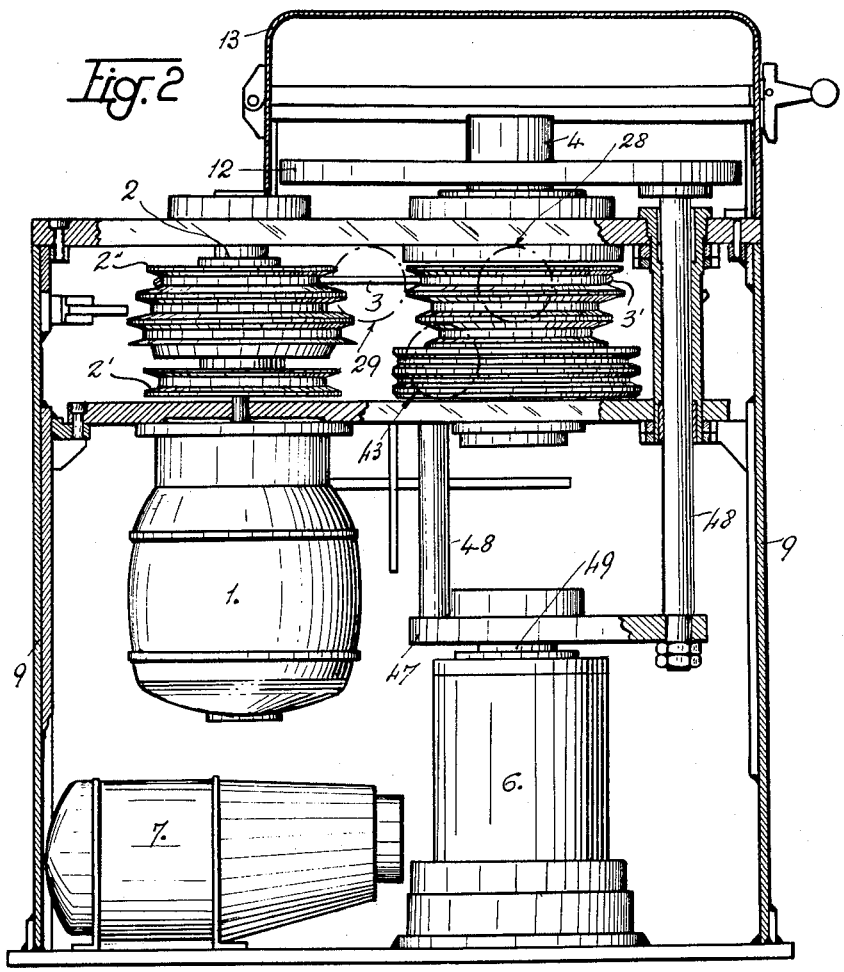
Fig. 2 is a corresponding view from the rear after removal of the rear wall of the casing.
Figure 3:
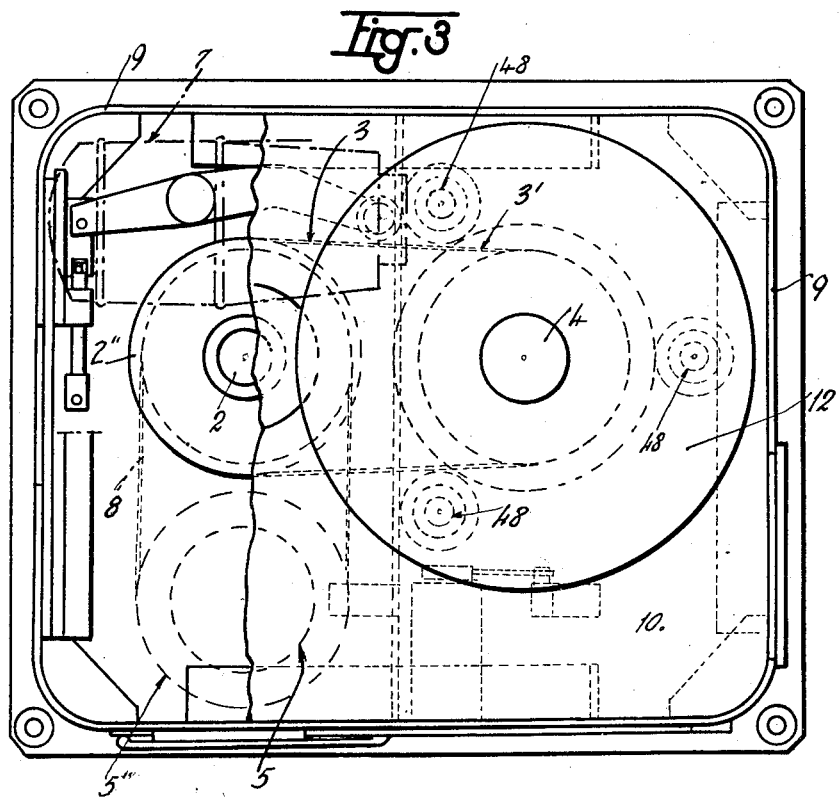
Fig. 3 is a plan view after removal of the top of the casing and of the mould cover.

Turning to Figs. 1, 2, 3 and 10 the machine illustrated diagrammatically includes:

An electric motor 1 driving through its shaft 2 rotating pulleys 2" and 3' by belt 3 and a hydraulically controlled clutch E, the shaft 4 at the upper end of which is mounted the rotary mould C;

A hydraulic pump 5 feeding oil or the like driving fluid, as shown in Fig. 4, into the cylinder 6 controlling the movements of the table carrying the parts ejecting the moulded articles and which pump is driven by motor 1 through its shaft 2 rotating pulley 2' and pulley 5" through belt 8;

A pump 7 having an electric driving motor (not shown) for being driven thereby will be described as to function thereof hereinafter.

All these parts are enclosed inside a casing 9, the upper part of which is closed by a partition 10 carrying an auxiliary hood 11 inside which are housed the ejection table 12 and the mould which is not illustrated, said auxiliary hood 11 being provided with a cover 13.

The hydraulic connections of the machine are illustrated diagrammatically in Fig. 4 where the hydraulic pump and pump 7 are again shown at 5 and 7, while the container for oil or the like driving fluid is shown at 14.

The oil sucked through the pipe 15 by the pump 7 is continuously delivered into the pipe 16 provided with a valve 17 in which the flow is adjusted by a spring, said valve being associated with an oil returning channel 17' and with a manometer 18. The oil passing out of the valve 17 and pipe 16 serves for feeding all the parts of the machine, which are to be continuously lubricated and which are illustrated diagrammatically by the rectangle 19, the oil returning finally through the pipe 20 into the reservoir 14.

The oil delivered continuously by the pump 7 passes also into the pipe 21, branching off the pipe 16 so as to actuate, through corresponding pipes 22 and 23 provided with adjustable valves 25 and 24 and manometers 27 and 26, different parts, to wit: the oil passing out of the pipe 22 enters the rotary valve 29 and the channel 32 so as to act on the spring-urged piston 35, which in its turn controls the means, not illustrated, which provide for the hydraulical braking of the shaft 4, while on the other hand the oil flowing out of the pipe 23 enters the rotary valve 28 so as to feed selectively through the pipe 30 the spring-urged piston 33 controlling the hydraulic clutch connecting the shaft 2 of the motor 1 with the shaft 4 carrying the mould and through the pipe 31, the spring urged piston 34 controlling the engagement of pulley 5" with the drive shaft 5' of the hydraulic pump 5.

The hydraulic clutch and the hydraulic braking means and also the pump 7 and the electric motor may be of any known or suitable type.

The hydraulic pump 5, when actuated, sucks oil out of the reservoir 14 through the pipes 36 and 37 and delivers it into the pipe 38 provided with a damper 39 and with a manometer 40 while two spring-urged valves 41 and 42 limiting the output to a maximum, provide for the return of the oil through the pipes 41' and 42'.

The oil delivered by the pump 5 passes out of the pipe 38 into the rotary oil-controlling valve 43 so as to feed the cylinder 6 controlling the table 12 and to shift the piston 46 inside the cylinder 6, with a view to raising the table through its flowing in the pipe 44 or else to lowering said table when the oil flows through the pipe 45.

Figure 5:
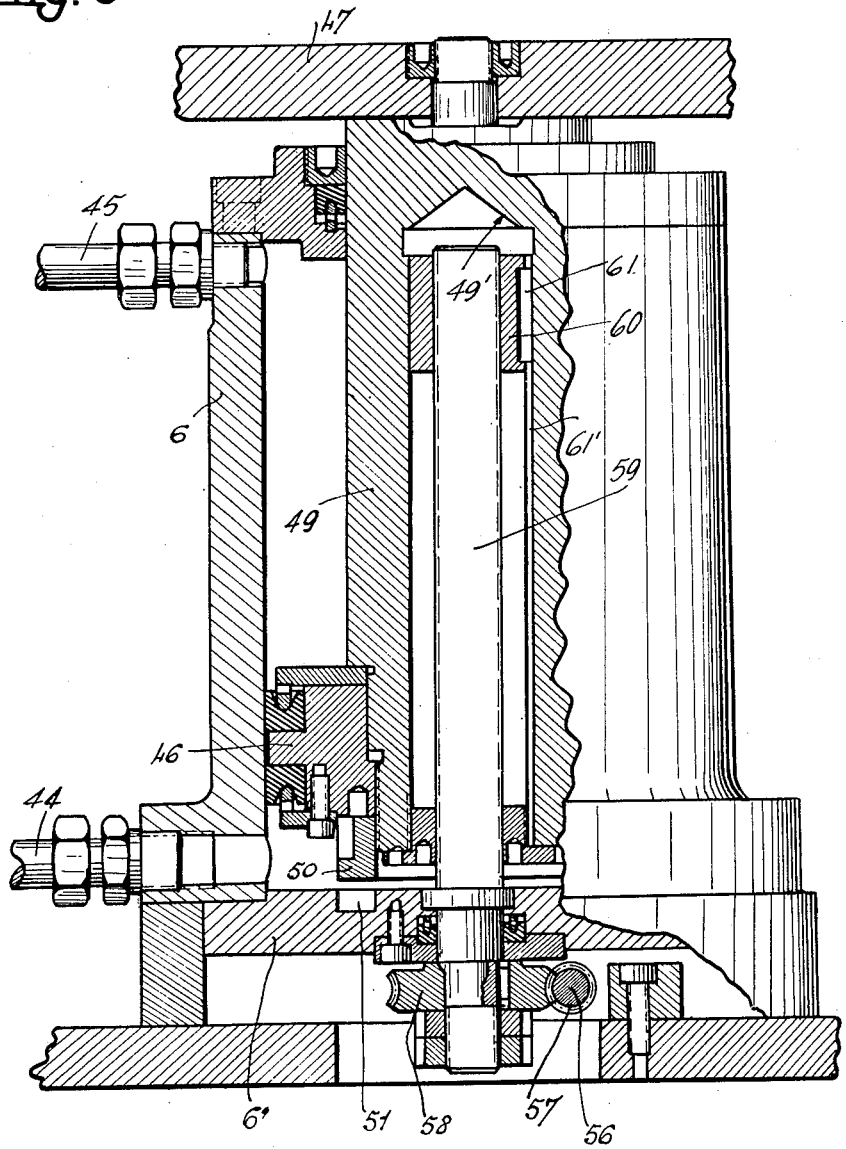
Fig. 5 is a sectional elevational view of the hydraulic cylinder controlling the movements of the ejection table.

The piston 46 moving inside the cylinder 6 acts on the table 12 through the agency of a plate 47 (Fig. 2) carrying three uprights 48 the upper ends of which carry in their turn the table 12. 49 designates the rod carrying the piston 46. At the end of the downward stroke of the table 12 and with a view to preventing any shocks, said piston 49, the lower end of which moves inside an oil bath filling the lower part of the cylinder 6 underneath the piston 46, enters through an annular collar 50 provided thereon inside a corresponding annular recess 51 formed in the cover 6' of the cylinder 6 and which is always filled with oil. This volume of oil enclosed inside said recess 51 forms an elastic damping cushion preventing any shocks from arising at the end of the downward stroke of the table 12 (Fig. 5).

It is possible to adjust, as required, the lift of the table 12 by means of the following arrangement. 52 designates a control wheel (Fig. 1) acting through the sprocket wheels 53 and 54 engaging the chain 55, on a horizontal shaft 56. The latter produces, through the agency of a worm 57 (Fig. 5) and a wormwheel 58, the rotation of a vertical shaft 59 extending inside the piston rod and threaded throughout its length. Consequently, the rotation imparted to the shaft 56 by the control wheel 52 constrains a nut 60 to move to a corresponding extent over said shaft 59 engaged by it, said nut has a key 61 extending into a longitudinal slot 61' in the bore 49' of piston 49 which also serves for holding the nut against rotation therein.

At the beginning of a moulding operation, it is therefore possible to adjust as required the height of the table 12 with reference to the mould secured to the shaft 4, through action on the control wheel 52. This adjustment being performed, the piston 46 will be housed at a predetermined height inside the cylinder 6 and its upward stroke, produced by the driving fluid delivered by the pump 5, will consequently be modified by a corresponding height.

The movements of the different parts of the machine, such as those providing for the engagement of the pump 5, with pulley 5", the braking of the shaft 4 and the control of the table 12, should be interconnected in a manner such as will ensure perfect reliability in operation, while preventing any untimely operation in a quite certain manner. The interconnections required for this purpose may be obtained as follows (Figs. 6 to 9).

The rotary valves 28 and 29 are provided each with a peripheral notch, 62 and 63 respectively, and a sliding rod 64 is adapted, through engagement of one of its ends inside the notch 63 of the valve 29, to lock said valve 29 in the position corresponding to the release of the brake of the shaft 4 (Fig. 6), while the other end of said sliding rod has disengaged the notch 62 in the valve 28 so that the latter may be freely shifted into the position providing for operation of piston 33 and thereby the engagement of the clutch controlling the shaft 4.

Reversely (Fig. 7), when the rod 64 engages the notch 62 of the valve 28, it holds the latter in the position for operating piston 34 and thereby the engagement of the pump 5 with pulley 5", but this is possible only when its other end has disengaged the notch 63 of the valve 29 so that the latter may assume the position corresponding to the braking of the shaft 4.

Similarly, the valve 43 is provided with a notch 65 and the valve 29 is provided with a second notch 66 while a sliding rod 67 may either engage, as shown in Fig. 6, the notch 65 of the valve 43 so as to hold the latter in the position corresponding to the lowermost location of the table 12 while the valve 29 is free to rock, or else said sliding rod 67 may engage, as shown in Fig. 7, the notch 66 in the valve 29 so as to allow bringing the valve 43 into its position corresponding to the uppermost location of the table 12, while the valve 29 is locked in its position corresponding to a braking of the shaft 4.

Figure 8:
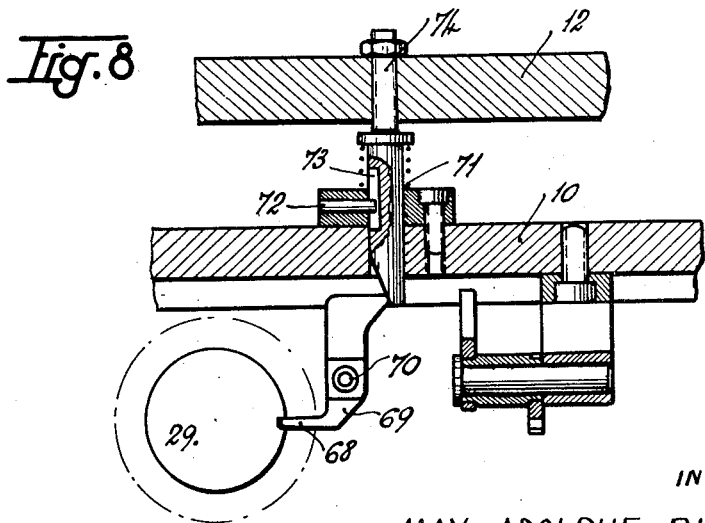
Fig. 8 is a detail view of the means through which the ejection table holds the operation of the brake-controlling valve under control.

The valve 29 may also be locked (Figs. 7 and 8) by the terminal hook 68 of a lever 69 pivotally secured at 70 and engaged by a spring-urged projection 71 the movements of which are limited in both directions by a stationary stop 72 adapted to engage either end of a longitudinal recess 73 formed in the projection 71 (Fig. 8). This projection 71 may be urged downwardly against the action of its return spring by an abutment 74 rigid with the table 12 when the latter reaches its lowermost position. The projection 71 releases then the hook 68 with reference to the valve 29 so that the latter may now be actuated.

A last safety means is provided between the cover 13 and the valve 29. As shown in Fig. 9, valve 29 is adapted to be locked by the terminal hook 75 of a lever 76 pivotally secured at 77 and submitted to the action of a rod 78 sliding vertically through the table 12, said rod terminating with a spring-urged head 79 adapted to be engaged by the cover 13 when the latter is closed and locked.

Spring-urged projections 80 and 81 (Fig. 9) urge automatically the levers 69 and 76, provided with terminal hooks, back into the positions for which they lock the valve 29.

The operation of the different safety and protection devices described hereinabove, is as follows:

In the first place, the valves 28, 29 and 43 may be rocked by the hand-operable levers 82, 83 and 84 of Fig. 1. Now, none of the rotary valves may be shifted if the cover 13 has not been first closed so as to release the valve 29 which is otherwise held fast by the hook 75. As long as said valve 29 is thus held fast in the position illustrated in Fig. 7, the shaft 4 is braked and the valve 28 remains stationary in the position corresponding to operation of the pump 5 while the table 12 is still in its uppermost position.

In order to release the valve 29 and thereby the valve 28, it is necessary first for the table 12 to release the hook 68 engaging the valve 29, the table 12 providing for this release by returning into its lowermost position, under the action of the lever 84 producing a rotation of the valve 43 through 90° in an anti-clockwise direction, as seen in Fig. 7.

The table being thus lowered, the machine is ready for a moulding operation. The cover 13 is now closed so that the valve 29 is released with reference to the two hooks 68 and 75 and may be angularly shifted.

The valve 29 is then caused to rotate through 90° clockwise as seen in Fig. 6, under the action of its control lever 83, this being now possible because the rod 67 may be urged back by the valve 29 into engagement with the notch 65 of the valve 43 registering with the end of the rod by reason of its prior movement provided by the lowering of the table 12.

This rotation of the valve 29 releases the brake F of the shaft 4 controlled by the pump 7 and releases also, when this is done, the valve 28 while still holding the valve 43 in the locked position assumed by it.

It is now possible to act on the lever 82 so as to make the valve 28 rock through 90° clockwise, as seen in Fig. 6, whereby said valve 28 shifts the rod 64 into the notch 63 in the valve 29, which registers now with said rod, so as to hold the latter fast and furthermore, this rotation of the valve 28 produces the engagement of the shaft 4 with the motor 1 through the clutch controlled hydraulically by the pump 7, while the valve 43 remains always in the locked position described.

The shaft 4, which is no longer braked and which is engaged, starts rotating and the centrifugal moulding operation is executed. When the latter is at an end, the lever 82 is brought back into its prior position so as to disengage the mould-carrying shaft 4 and to start the pump 5. It is then possible to brake the shaft through operation of the lever 83 since the rod 64 now registers with the notch 62 of the valve 28 and may drop back into said notch. When the brake-controlling valve 29 has thus rocked through 90° in the anti-clockwise direction of Figs. 6 and 7, its notch 66 registers with the rod 67. It is then possible to act on the lever 84 so as to make the released valve 43 rock in the clockwise direction of said Figures 6 and 7, whereby the ejection table 12 is caused to rise under the action of the pump 5. The valves 28 and 29 are then held fast as shown in Fig. 7 and the hook 68 reengages the valve 29. The cover 13 is opened and the hook 75 reengages the valve 29, the moulded articles are released and the position of the different parts is the same as at the beginning of operation, so as to allow a further moulding operation which is prepared after the table 12 has been returned into its lowermost position through action on the lever 84.

In brief:

(a) The shaft 4 cannot be started if the brake F acting on the latter has not been previously released and the shaft 4 cannot be braked if the latter has not been previously disengaged;

(b) It is not possible to raise the ejection table 12 unless the shaft 4 has been previously disengaged and braked;

(c) The pump 5 cannot be started unless the shaft 4 has been previously disengaged;

(d) It is not possible to release the brake F acting on the shaft 4 unless the ejecting table has been previously lowered and the cover 13 has been previously closed.

A pipe 85 including connections cooperating with the corresponding valves 28, 29 and 43 allows the oil to return from the different sections of the machine into the oil reservoir 14.

What I claim is:

1. In a centrifugal molding machine having a main shaft carrying the centrifugal mold and a movable table for the ejection of the molded articles, a control system comprising a driving motor, means for detachably connecting said motor to said shaft, means for braking said shaft, a cylinder having fluid openings in opposite end portions thereof, a piston slidably mounted in said cylinder and connected to said table for moving the same, a plurality of hydraulically operated devices, one of said devices being operatively connected to said braking means, a second of said devices being operatively connected to said shaft detachable means, a driven hydraulic pump connected to a source of fluid, a third of said devices being operatively connected to said pump, a second pump being connected to said source of fluid, and said motor for being driven thereby, a system of pipes connecting said second pump to said devices for supplying fluid, pipes connecting said first pump to both ends of said cylinder for supplying fluid thereto, a plurality of rotary valves, one of said valves interconnected in the pipes leading to both ends of said cylinder for controlling the flow of fluid thereto and the piston therein, a second of said valves interconnected in the pipes leading to said device controlling said braking means, a third of said valves interconnected in the pipes leading to said devices controlling said hydraulic pump and said detachable connector means for said shaft, means interconnecting said second valve and said third valve permitting rotation of only one valve at a time, means interconnecting said first valve and said second valve permitting rotation of only one valve at a time whereby said valves can only be operated to provide for the release of said braking means, connection of said shaft to said motor, disconnection of said shaft to said motor, starting of said hydraulic pump, application of said braking means to said shaft, and raising and lowering of said table, in that order.

2. In a centrifugally operating molding machine hydraulic control as claimed in claim 1, including means for positioning said piston controlling the position of the ejection table inside said cylinder before any molding operation is started, consisting of said piston having a longitudinal bore, a nut keyed within said bore to prevent rotation therebetween, a threaded rod extending in said piston bore and having said nut in threaded engagement therewith, means connected to rod for rotating the same as desired.

3. In a centrifugal molding machine hydraulic control as claimed in claim 1 including catch means for locking said valve controlling the operation and the release of said braking means for the main shaft being operatively connected to the ejection table for locking said valve as long as said table is not in its lowermost position.

4. In a centrifugal molding machine hydraulic control as claimed in claim 1, including a cover for the mold and catch means for locking said valve controlling the operation and the release of said braking means for the main shaft being operatively connected to said cover for locking said braking means in its position for braking said shaft as long as said cover is not closed on said mold.

References Cited in the file of this patent

UNITED STATES PATENTS

| | | |
|---|---|---|
| 2,438,691 | Armantrout | Mar. 30, 1948 |
| 2,483,094 | Harvey | Sept. 27, 1949 |
| 2,509,783 | Richardson | May 30, 1950 |
| 2,618,031 | Mazer | Nov. 18, 1952 |
| 2,746,256 | Fell | May 22, 1956 |